No. 815,108. PATENTED MAR. 13, 1906.
E. J. LORING.
SPEED INDICATOR.
APPLICATION FILED AUG. 16, 1905.

2 SHEETS—SHEET 1.

Witnesses
Wm C Richardson
Lincoln

Inventor
Ernest J. Loring
By Richard P. Elliott
Attorney

No. 815,108. PATENTED MAR. 13, 1906.
E. J. LORING.
SPEED INDICATOR.
APPLICATION FILED AUG. 16, 1905.

2 SHEETS—SHEET 2.

Witnesses
Wm C Richardson
Gencoles

Inventor
Ernest J Loring
By Richard V Elliott
Attorney

UNITED STATES PATENT OFFICE.

ERNEST J. LORING, OF SOMERVILLE, MASSACHUSETTS.

SPEED-INDICATOR.

No. 815,108.   Specification of Letters Patent.   Patented March 13, 1906.

Application filed August 16, 1905. Serial No. 274,400.

*To all whom it may concern:*

Be it known that I, ERNEST J. LORING, a citizen of the United States, residing in Somerville, county of Middlesex, and Commonwealth of Massachusetts, have invented new and useful Improvements in Speed-Indicators, of which the following is a specification, reference being had to the drawings which accompany the same.

My invention relates to a device for measuring and indicating the speed of moving bodies, such as the speed of an automobile, or the number of revolutions or surface speed of a moving body.

The object of my invention is to so construct and arrange the moving parts of a speed-indicator that they will be in gravitational balance at all times and not be affected by the jar of the mechanism to which it may be attached or by a sudden shock.

Another object is to form and arrange the various parts in such manner as to avoid friction in the moving parts.

A further object of my improvement is to provide a stop to lock the indicator mechanism to preserve a more or less permanent record of the speed of the moving body to which it may be attached and to so construct the mechanism that an odometer may be operated from its moving parts to indicate the distance traveled.

Figure 1:
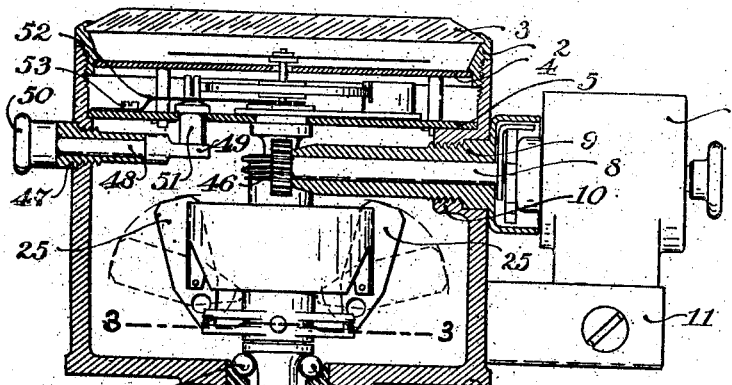
Figure 2:
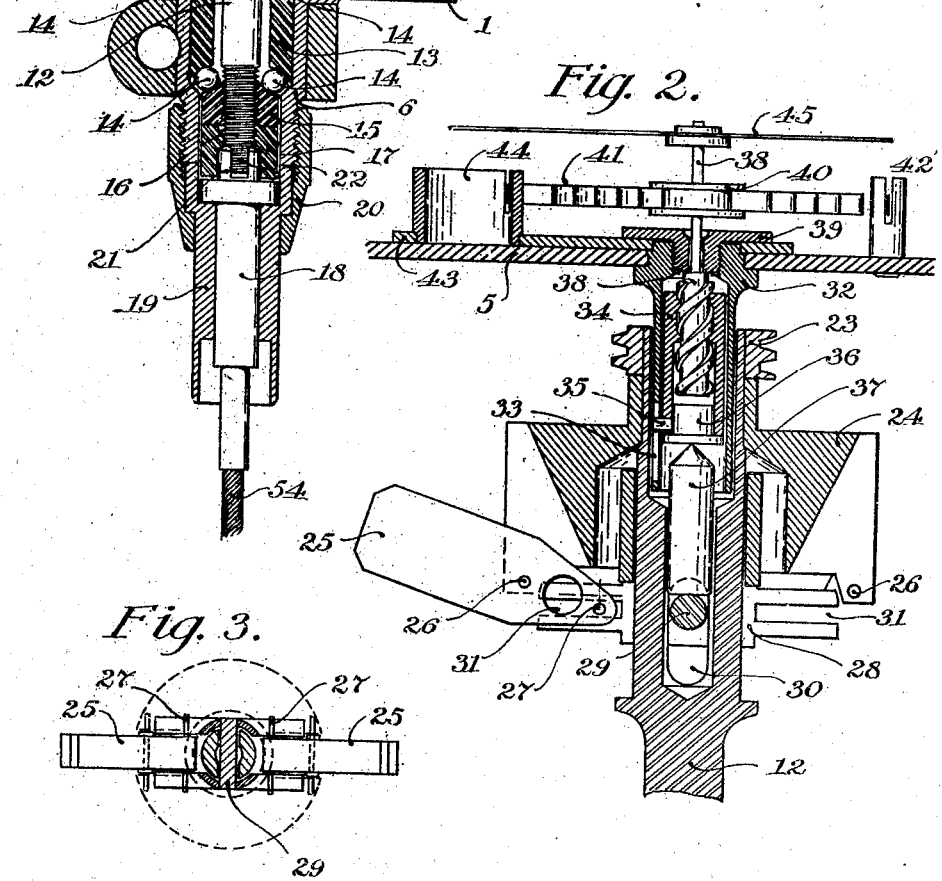
Figure 3:
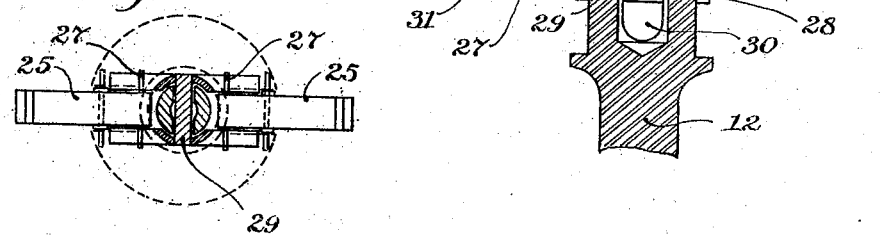
Figure 5:
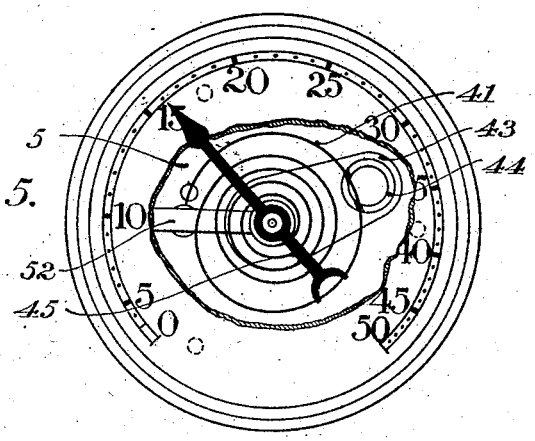
Figure 4:
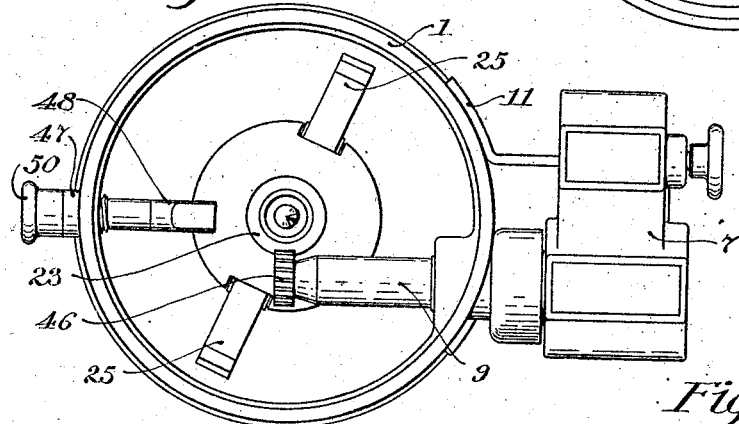
Figure 6:
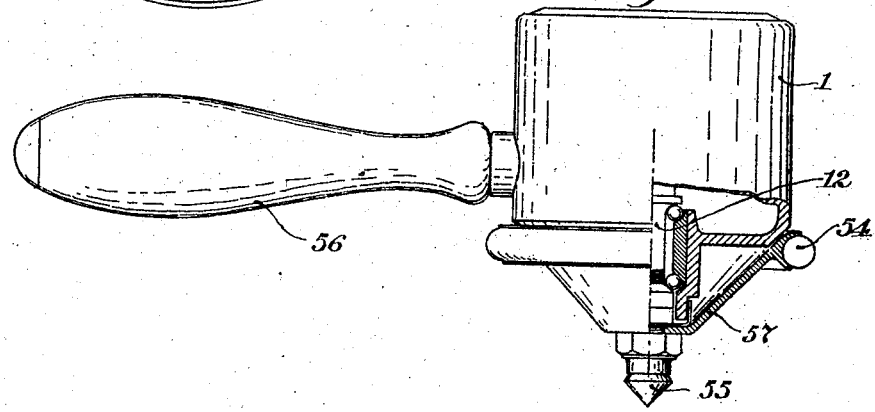

In the drawings, Figure 1 represents a sectional elevation through the center of the speed-indicator. Fig. 2 is a partial sectional elevation through the center of my device with the parts shown enlarged. Fig. 3 is a section of a portion of my indicator, taken through line 3 3, Fig. 1. Fig. 4 is a plan view of my device with the dial, pointer, and spring removed. Fig. 5 is a plan view of the face of my device, showing the pointer and dial-graduations, a portion of the dial being cut away to show the spring and its manner of attachment. Fig. 6 is a modified form of my device as constructed for indicating speed of revolving or moving bodies, such as shafting, belts, pulleys, &c.

The moving parts of my improved speed-indicator are contained in a casing 1, which has a screw-threaded portion at its upper end and in which a cap 2 is fitted.

3 is a glass disk inclosed in the upper edge of the cap 2 in such manner as to protect the working parts of the speed-indicator.

4 is a dial which is secured in a recess in the cap 2 and has on its face graduations and figures indicating the speed of the moving body to which the indicator is attached, which figures and graduations may be engraved, stamped, or otherwise placed upon the dial.

5 is an inner brass disk which forms a bearing for a portion of the moving parts of the indicator.

6 is a projection or socket on the lower end of the casing 1, bored out to receive a portion of the bearings of the moving parts of the speed-indicator.

7 is an odometer which is mounted to connect with the shaft 8, which shaft has a bearing in the hollow tube 9. The hollow tube 9 is mounted in a boss 10 in the side of the casing 1.

11 is a bracket which is mounted upon the casing 1 and is adapted to support the odometer 7.

The moving parts of my improved indicator consist of the driving-shaft 12, which is supported in the ball-races of the bearing 13 by the balls 14 14 14 14 in a manner to revolve freely in said bearing 13.

15 is an adjusting-nut having a ball-race in one of its ends and is mounted on a screw-threaded bearing upon the end 16 of the shaft 12. The locking-nut 17 is mounted on the threaded portion 16 to prevent the adjusting-nut 15 from being loosened after the bearings are adjusted.

18 is the coupling end of a flexible shaft 54 used to drive the moving parts of the speed-indicator. Said connection 18 has a bearing in the portion 19. The union-nut 20 is mounted upon the portion 19 and has a shoulder to support it and is screw-threaded at its upper end to fit upon the lower end of the hollow socket 6 in such manner that when said nut 20 is screwed upon said portion 6 it presses the upper end of the bearing 19 against the lower end of the socket 6, securely holding it in proper alinement. The upper end of the coupling 18 is slotted at 21 to receive the flattened portion 22 of the shaft 12. The purpose of this form of coupling is to provide for quickly attaching and detaching the speed-indicator from the flexible shaft.

Turning now to Fig. 2, which shows an enlarged view of the details of construction of the moving parts of my speed-indicator, the shaft 12 is represented as extending upwardly to a point where it has mounted upon it the worm 23, which serves as a collar to hold the parts in proper position. 24 represents a round portion of metal which serves as a balance-wheel for the moving parts of my mechanism as well as for a bearing to which the weights 25 may be pivoted by means of the pivot-pins 26, which pass through holes in the portion 24 and through holes in the weights 25. Said weights 25 have the pins 27 inserted in their lower ends to project beyond its side walls, as shown in Fig. 3. 28 is a longitudinally-movable sleeve which is mounted upon the rotating shaft 12 in such manner as to rotate therewith and move freely longitudinally. Said sleeve 28 has a hole near its lower end through which is inserted the pin 29, so as to extend through the side walls of said sleeve 28 and through a slotted opening 30 in the shaft 12 to insure the rotation of the sleeve 28 through said shaft 12 and to permit longitudinal movement of said sleeve 28. 31 31 are radial slots in the projecting portions of the sleeve 28 and are of proper width to receive the ends of the pins 27, so that any movement up and down of the outer end of said weights 25 would cause the sleeve 28 to move longitudinally on the shaft 12 and the pins 27 27 to slide in and out in the slots 31 31. The plate 5 has a hole in its central portion adapted to have mounted therein the sleeve 32, the upper end of which is screw-threaded to secure the bearing 39. Said sleeve 32 extends downwardly, as shown in Fig. 2, and has at its lower end a slot 33. It also has mounted therein the nut 34, which is threaded at its upper end, its lower end having threaded therein a screw 35, which extends outwardly through the slot 33, the pin 35 and the slot 33 being so arranged as to prevent the nut 34 from revolving in the sleeve 32, but to permit it to move longitudinally therein. Fitted into the lower end of said nut 34 is a plug 36, the lower surface of which is flat. 37 is a pointed pin which is inserted in a hole in the shaft 12, its pointed end bearing against the lower surface of the plug 36 and its lower end against the pin 29, so that any longitudinal movement of the sleeve 28 would be communicated to the pin 29, thence to the pointed pin 37 and the nut 34 through the plug 36. 38 is a spindle having a sharply-inclined threaded portion adapted to loosely fit in the threaded portion of the nut 34, so that a longitudinal movement of the nut 34 will revolve the spindle 38. Said spindle 38 has a bearing in the screw-collar 39, which bearing may be jeweled, if found desirable, so that the pin 38 will revolve therein with as little friction as possible. The spindle 38 has secured thereto the collar 40, to which is attached the inner end of a convolute spring 41, the outer end of said spring being attached to a stud 42, which in turn is secured in the plate 4. 43 is an adjusting-lever which is mounted upon the upper end of the sleeve 32 in a manner to revolve around the same. Said lever 43 has a hollow shell 44 secured therein which is slotted at its inner edge to receive the outer coil of the spring 41 and is for the purpose of adjusting the tension of said spring 41 by moving it in manner similar to the manner of adjusting the balance-spring in a watch or clock. The shaft 38 has mounted upon its outer end a pointer 45, which is secured to it in such manner as to rotate therewith. There is attached to the inner end of the odometer-operating shaft 8 the worm-gear 46, which is fitted to enmesh with the worm 23, so that when said worm 23 is revolved it will revolve the shaft 8 and the odometer mechanism to register the distance traveled as communicated by the rotating parts of the speed-indicator. 47 is a sleeve which is threaded into the side of the casing 1 and has mounted to revolve therein a shaft 48. Said shaft 48 has a flattened portion 49 on its inner end and a round cap 50 on its outer end used to revolve said shaft 48. 51 is a plug mounted in the disk 5 in such manner as to be free to move longitudinally. Said plug 51 is arranged to press against the bottom of a spring 52, which spring is secured to the disk 5 by the screw 53, its inner end being adapted to press against the under side of the collar 40. Said collar 40 is mounted on the spindle 38, the parts 49 and 51 being so arranged that by revolving the circular cap 50 the plug 51 will be pressed upwardly and press against the spring 52, thereby causing the inner end of said spring 52 to press against the collar 40 to hold the pointer in whatever position it may be in when the shaft 48 is revolved.

The object of the locking device just described is that when it is desired to keep a more or less permanent record of such speed the cap 50 may be turned to lock the pointer 45 at the graduation indicated and cause it to remain there until the spring 52 is released by turning the cap 50 to the position shown in Fig. 1.

The spring 41 may be adjusted to give more or less tension on the shaft 38 by moving the lever 43 toward the center end of the spring, thereby reducing the number of convolutions of the spring between the point where it is attached to the shaft 38 and the point where it passes through the slot in the hollow stud 44. The lever 43 may be held in its adjusted position by filling the hollow portion of the stud 44 with sealing-wax. This insures the permanency of the adjustment as well as the instrument against being tampered with to throw it out of adjustment.

In practice when used as a speed-indicator for automobiles the instrument is attached to the dashboard or any other convenient place on an automoblie and connected by a flexible shaft 54 with the hub of one of the wheels or any other revolving part of the automobile from which the speed traveled may be taken.

Fig. 6 represents a modified form of my speed-indicator as used in indicating or measuring the surface speed of a moving object, such as a pulley, shaft or belt, or the number of revolutions of a pulley or shaft. 15 represents the casing of the speed-indicator, and 56 a handle to hold same. 57 represents a wheel attached to the revolving shaft 12 of the instrument and has on its periphery a ring 54, made of rubber or other similar material, so that it may be contacted with the surface of a moving object to revolve the shaft 12. 55 is a pointed plug which is adapted to be placed in the center hole in a shaft, so that the rate of revolutions of said shaft may be measured. The construction of the moving parts of the modified form shown in Fig. 6 is identically the same as is shown in Figs. 1 and 2, although two sets of graduations may be placed upon the dial 4, so as to indicate the surface speed of a moving object or the number of its revolutions.

The weight-arms 25, which are moved in and out from the shaft on their pivot-joints 26, are counterpoised by the weight of the sleeve 28, the pin 37, the nut 34, and screw 35, so that any jar or shock sidewise or lengthwise of the instrument would not change the position of the weight-arms or of the longitudinally-moving parts referred to owing to its gravitational balance. The upper parts of the weight-arms 25 are thrown outwardly by the force due to the revolving of the shaft 12. The outward movement of the outer ends of said weights 25 is counterbalanced by the tension of the spring 41 exerted through the shaft 38, the screw-threaded portion at its lower end, the nut 34, the pin 37, pin 29, and the sleeve 28.

The operation of my improved speed-indicator is as follows: I will first refer to the position of the parts as indicated in Fig. 1. The parts of the indicator as shown in full lines illustrate their position when the instrument is at rest. This shows the weight-arms 25 moved upwardly and nearly parallel with the shaft 12 through the tension of the spring 41. When my speed-indicator is to be used to measure the speed at which an automobile is traveling, the shaft 12 of the speed-indicator will be so connected to the revolving parts of the automobile as to revolve at a speed proportional to the diameter of its wheels. From this proportion the graduations on the dial of the speed-indicator may be calculated so as to measure the rate of speed per minute or per hour at which the automobile is traveling. Upon revolving the shaft 12 from the moving part of an automobile to which it is connected the sleeve 28 and the weight-arms 25 will be caused to revolve, and as the outer ends are considerably heavier than the inner ones the centrifugal force will cause the outer ends to move outwardly and the sleeve 28 to move upwardly through the pins 27 and slots 31, thereby moving the pin 29, pointed pin 37, and nut 34 upwardly, which movement will cause the shaft 38 and pointer 45 to revolve against the tension of the spring 41 a distance proportional to the rate of revolutions of said shaft 12, thus indicating on the dial of the speed-indicator the speed per minute or per hour at which the automobile is traveling. The shaft 38 and pointer 45 will be rotated a greater or less distance, according as the speed of the shaft 12 is increased or decreased. Increased speed of the shaft 12 will cause the weight-arms 25 to assume a greater angle to said shaft 12, and thereby rotate the shaft 38 and pointer 45 a greater distance through the parts connecting it to the shaft 12.

Having described my device, what I claim is—

1. A speed-indicator, comprising a revolving body; laterally-oscillated arms pivotally mounted in said revolving body; means operated by said oscillating arms arranged to move axially of said revolving body, said revolving body and said arms arranged to gravitationally balance each other in all positions; a rotatively-oscillating pointer rotated in one direction by said axially-moving means; and a spring to return said pointer to its normal zero position.

2. A speed-indicator comprising a revolving portion; laterally-oscillating portions pivoted thereto; means connected with said laterally-oscillating portions arranged to move longitudinally to said revolving body; a shaft rotated by said longitudinally-moving means; a spring attached to said rotating shaft; and indicating means attached to said shaft.

3. A speed-indicator, comprising a casing; a revolving body having a bearing in said casing; laterally-movable weights pivoted to said revolving body; a rotating and axially-moving member operated by said weights, said weights and said axially-movable member arranged to be in gravitational balance in all positions; means rotated by said axially-movable member; and a spring for returning said weights and rotative member to their normal zero positions.

4. A speed-indicator, comprising a revolving body; laterally-oscillating weights pivoted to said body; an axially-movable and rotative member operated by said laterally-oscillating weights; axially-movable members connected with said rotating and axially-movable member; a pointer, all said members rotating about a common center, and so arranged that the axially-movable members will be in gravitational balance with the laterally-oscillating members in all positions, whereby said means will be unaffected by position, shock or vibrations; and a spring member for returning all said members to their normal zero positions.

5. In a speed-indicator; a casing; a revolving body mounted in bearings in said casing;

laterally-oscillated weights mounted in said revolving body; means connecting said laterally-oscillating weights with a rotating pointer, and arranged to rotate same, all said parts rotating about a common center and so arranged as to be in gravitational balance in all positions; a spring for returning all said parts to their normal zero positions; and means for locking said rotating pointer at any point in its movement.

6. In a speed-indicator, a casing, a revolving body mounted in bearings in said casing; means for revolving said revolving body; means mounted on said casing for preserving a record of the rate of revolution of said revolving body; and a spring for returning the parts to their normal positions.

7. A speed-indicator, comprising a casing; a revolving body mounted in said casing; oscillating arms pivoted to said body; axially-movable members pivoted to said oscillating arms; a rotative pointer; a spring for returning said parts to their normal zero positions, all said means being arranged to revolve about a common center and in gravitational balance with each other in all positions; and means for connecting and driving said revolving body from a center hole in a revolving body or from the surface of said body to indicate the number of revolutions of said body or of the moving speed of its surface.

8. In a speed-indicator, rotative indicating means operated by an axially-moving member; a spring for returning said indicating means to its normal zero position; a revolving body; laterally-disposed weights pivoted to said revolving body; axially-moving members slidably pivoted to said weights, said axially-movable members being so arranged as to be in gravitational balance with said laterally-movable weights in all positions; and means for revolving said oscillating weights and revoluble body from the object the speed of which is to be indicated.

In testimony whereof I have hereunto set my hand, in the presence of two subscribing witnesses, this the 15th day of August, A. D. 1905.

ERNEST J. LORING.

Witnesses:
R. P. ELLIOTT,
GERTRUDE M. COLES.